(12) United States Patent
Redondo Garcia et al.

(10) Patent No.: US 11,413,829 B2
(45) Date of Patent: Aug. 16, 2022

(54) WELDING STATION FOR AN INSTALLATION FOR MANUFACTURING PACKAGES WITH PADS

(71) Applicant: AGIL PACKAGING System, S. L.., Navarra (ES)

(72) Inventors: Eladio Eduardo Redondo Garcia, Pamplona (ES); Miguel Angel Ardanaz Yunta, Ciriza (ES)

(73) Assignee: AGIL PACKAGING SYSTEM, S. L., Navarra (ES)

( * ) Notice: Subject to any disclaimer, the term of this patent is extended or adjusted under 35 U.S.C. 154(b) by 0 days.

(21) Appl. No.: 17/332,161

(22) Filed: May 27, 2021

(65) Prior Publication Data

US 2021/0370618 A1 Dec. 2, 2021

(30) Foreign Application Priority Data

Jun. 1, 2020 (EP) ...................... 20382467

(51) Int. Cl.
*B29C 65/00* (2006.01)
*B31B 70/64* (2017.01)
(Continued)

(52) U.S. Cl.
CPC ............ *B29C 66/836* (2013.01); *B29C 65/16* (2013.01); *B29C 66/41* (2013.01); *B29C 66/849* (2013.01);
(Continued)

(58) Field of Classification Search
CPC ..... B29C 66/41; B29C 66/836; B29C 66/849; B29C 65/16; B29L 2031/712; B31B 70/644; B31B 70/04; B31B 70/022
See application file for complete search history.

(56) References Cited

U.S. PATENT DOCUMENTS 3,765,990 A 10/1973 Histed et al.
5,184,447 A * 2/1993 Johnsen ................. B29C 65/10
53/373.9

(Continued)

FOREIGN PATENT DOCUMENTS

EP 3018071 A1 5/2016
GB 1476263 A * 6/1977 ....... B29C 66/81811

OTHER PUBLICATIONS

Extended European Search Report of the European Patent Office. European Application No. 20382467.7 issued by the European Patent Office, dated Oct. 28, 2020, Munich, Germany.

*Primary Examiner* — Daniel McNally
(74) *Attorney, Agent, or Firm* — Peter B. Scull; EIP US LLP

(57) ABSTRACT

A welding station for an installation for manufacturing packages with pads, the welding station including a plurality of longitudinal welding heads. Each welding head is configured to weld to one another two superposed sheets as said sheets advance in a first direction and may include a welder to apply heat on an action area. Each welding head has a main body, a first traction belt wound in the main body and a second traction belt wound to said main body, parallel to the first traction belt and separated from the first traction belt by a separation gap in a second direction which is transverse to the first direction. The action area is arranged in said separation gap, between both traction belts. Each of the longitudinal welding heads is configured to be able to be moved along the second direction.

15 Claims, 6 Drawing Sheets

(51) Int. Cl.
*B31B 70/04* (2017.01)
*B31B 70/02* (2017.01)
*B29C 65/16* (2006.01)
*B29L 31/00* (2006.01)

(52) U.S. Cl.
CPC ............ *B31B 70/022* (2017.08); *B31B 70/04* (2017.08); *B31B 70/644* (2017.08); *B29L 2031/712* (2013.01)

(56) References Cited

U.S. PATENT DOCUMENTS

| | | |
|---|---|---|
| 2002/0152722 A1 | 10/2002 | Stoddard et al. |
| 2008/0022630 A1 | 1/2008 | Fuss et al. |
| 2010/0050571 A1 | 3/2010 | Birkle et al. |

\* cited by examiner

WELDING STATION FOR AN INSTALLATION FOR MANUFACTURING PACKAGES WITH PADS

TECHNICAL FIELD

The present descriptions relate to welding stations used in installations for manufacturing packages with pads.

BACKGROUND

Some consumer items are transported protected by a special package. These types of packages are formed by plastic sheets including air pads or bubbles, according to the case.

In some cases, the package is general and is modified in size in accordance with the size of the item to be packaged. In other cases, however, the packages are adapted to the size of the item that they are going to protect. In this latter case, furthermore, it is possible for the package to be formed by several parts to be able to arrange it in different areas of the item to be protected.

In these latter cases, the package is of the type formed by pads. These packages are generally formed from two sheets which are joined or welded to one another both longitudinally and transversely, how and where desired, forming independent sectors therebetween (as a result of the different welds). If necessary, it is possible to keep a communication between the sectors. During the manufacture of the packages, the sectors are filled with air selectively, being left empty or full of air in accordance with desiderata therefor. A sector full of air is what is known as a pad.

SUMMARY

Disclosed is a welding station for an installation for manufacturing packages with pads.

A welding station hereof may include a plurality of longitudinal welding heads. Each longitudinal welding head is adapted to join or weld to one another two superposed sheets as said sheets advance in a first direction. Each longitudinal welding head may include a welder to weld by application of heat at a determined action area of the longitudinal welding head to carry out said welding by heat.

Each longitudinal welding head may include a main body, a first traction belt wound to the main body and a second traction belt wound to the main body, parallel to the first traction belt and separated from the first traction belt by a determined separation gap in a second direction which is preferably transverse to the first direction. The main body may include a first drive wheel with a first central shaft extending in the second direction, and a second drive wheel with a second central shaft extending parallel to the first central shaft and distant from said first central shaft in the first direction. Both traction belts are wound in both drive wheels of the main body.

The action area of each longitudinal welding head on which heat is applied is in the separation gap defined between both traction belts of the corresponding longitudinal welding head, such that the welding between the sheets done by each longitudinal welding head can be carried out in parts of said sheets which move facing said separation gap, between both traction belts of each longitudinal welding head. Thus, in the head a sealed area can be delimited between both traction belts, it being possible to apply the welding to join both sheets to one another in a secure and efficient manner.

These and other advantages and features of the developments hereof will become evident in view of the figures and of the detailed disclosure hereof.

DETAILED DESCRIPTION

Figure 4:
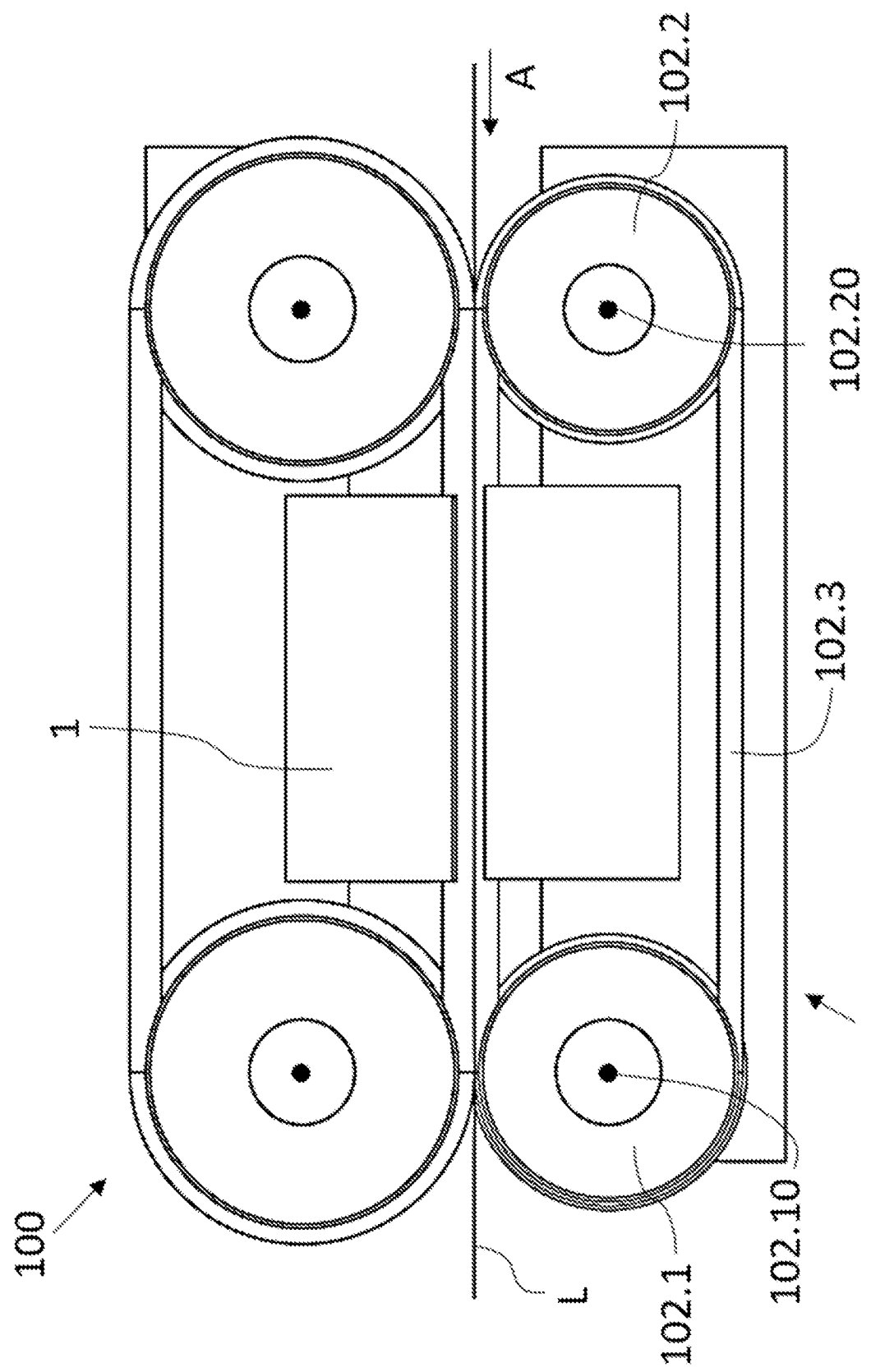
FIG. 4 shows a welding station according to one implementation.

FIG. 4 depicts an implementation of a welding station 500, including a plurality of longitudinal welding heads 100. The welding station 500 is adapted for installations 1000 in which packages with pads are manufactured.

Figure 1:
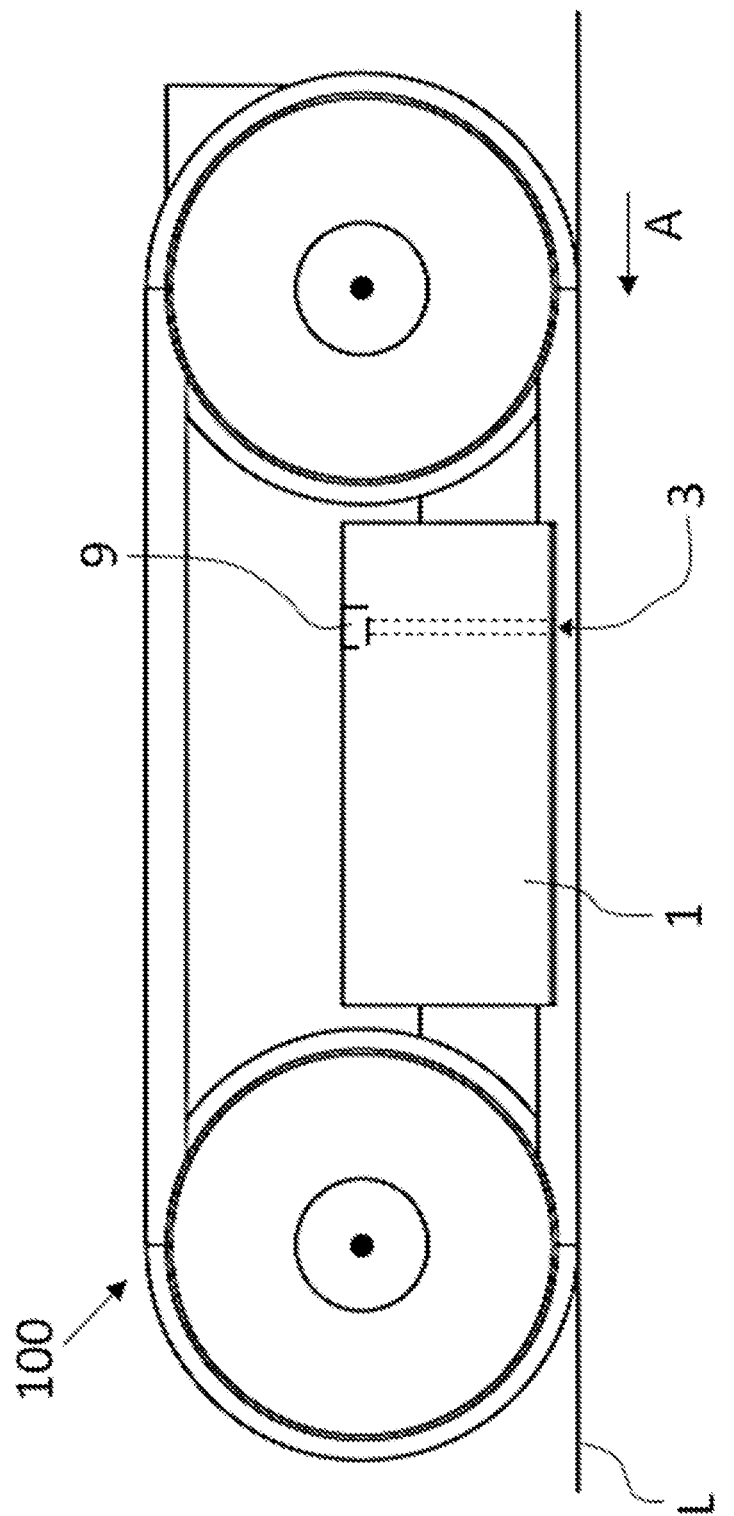
FIG. 1 shows a welding head of a welding station according to one implementation.

A longitudinal welding head 100 is configured to act on two superposed sheets L advancing in a determined first direction A (the figures depict the assembly formed by the superposed sheets L) along the welding station 500, said superposed sheets L facing said head 100, as shown in FIG. 1, and to weld or join said sheets L to one another in areas of said sheets L on which said head 100 acts. To that end, each head 100 may include a welder 9 that is configured to apply heat to a determined action area 3 of said head 100, or facing said head 100, such that when the sheets L pass through said action area 3, the sheets are joined or welded to one another by heat. The first direction A is preferably linear, the head 100 thus being configured to carry out longitudinal welds on the sheets L as said sheets L advance linearly.

Each head 100 includes a first traction belt 2.3 and a second traction belt 2.4 arranged in parallel to the first traction belt 2.3 and separated from the first traction belt 2.3 by a determined separation gap D in a second direction T, which is preferably transverse to the first direction A.

Figure 2:
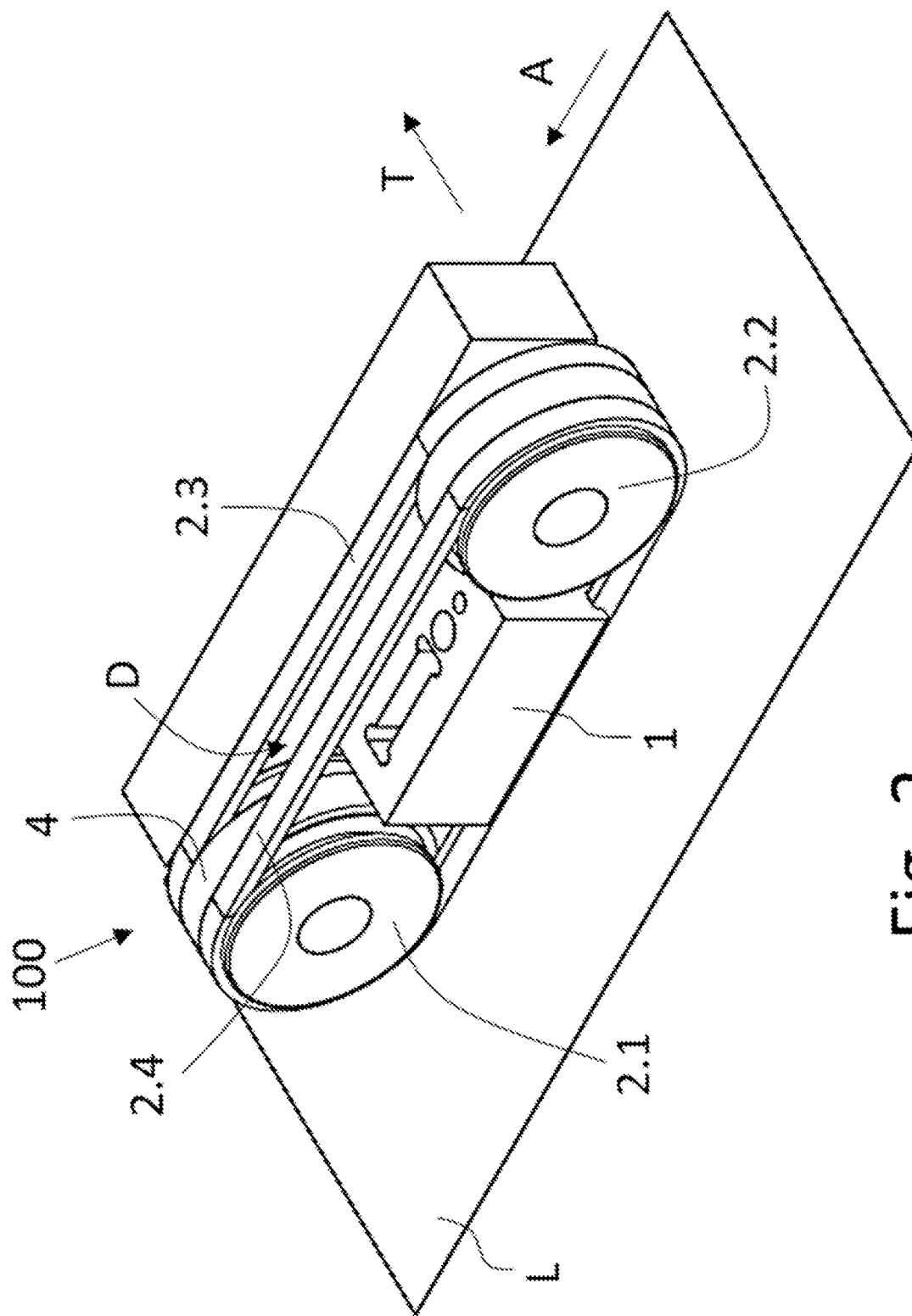
FIG. 2 shows in perspective the welding head of the implementation of FIG. 1.

Any head 100 may include a first drive wheel 2.1 with a first central shaft 2.10 extending in the second direction T, and a second drive wheel 2.2 with a second central shaft 2.20 extending parallel to the first central shaft 2.10 and distant from said first central shaft 2.10 in the first direction A. Both traction belts 2.3 and 2.4 of a head 100 are wound in both drive wheels 2.1 and 2.2, as shown in FIG. 2. The action area 3 is arranged in, or facing, said separation gap D. In this way, when the sheets L move, the areas of said sheets L which are in contact and/or facing said action area 3 are affected by said heat and are welded or joined to one another.

Alternatively, any head 100 may include a respective drive wheel for each traction belt 2.3 and 2.4 associated with each central shaft 2.1 and 2.2.

The drive wheels 2.1 and 2.2 are configured to rotate with respect to their respective central shafts 2.10 and 2.20, transmitting this rotation to the traction belts 2.3 and 2.4 which, in turn, aid the sheets L in moving in the first direction A (they pull the sheets L in said first direction A). The rotation of the drive wheels 2.1 and 2.2 is synchronized, and it is also synchronized with a traction device causing the movement of the sheets L in the first direction A, in the cases in which a traction device of this type may be used. In some implementations, one of the drive wheels 2.1 and 2.2 is motor-driven and the head 100 includes a transmission to transmit the rotation of said drive wheel 2.1 or 2.2 to the other drive wheel 2.1 or 2.2. In other implementations, the drive wheels 2.1 and 2.2 are motor-driven.

In some implementations, at least one head 100 may include a separating element 4 joined to each of the drive wheels 2.1 and 2.2, the first traction belt 2.3 being on one side of said separating element 4 with respect to the corresponding central shaft 2.10 and the second traction belt 2.4 being on the other side of said separating element 4. Said separating element 4 preferably includes a width equal to the width of the separation gap D in the second direction T. The outer surface of the separating element 4 of the head 100 is preferably at the same level as the outer surface of the traction belts 2.3 and 2.4. Thus, if said head 100 rests on a support (pressing, therefore, the sheets L against said support), a sealed area is generated between both traction belts 2.3 and 2.4 and both separating elements 4, the action area 3 being in said sealed area. As a result of the sealed area, by moving the sheets L between said support and the head 100 in the first direction A, the welding between said sheets L made by said head 100 can be carried out securely and in an environment isolated from the exterior (in the sealed area), such that most of the heat applied in the action area is furthermore taken advantage of to carry out the welding, a more effective welding being achieved. This furthermore allows having a welder providing a power adapted to the desiderata that may be used in order to carry out the welding, without sizing the welder in excess due to the possible heat losses.

To bear the traction belts 2.3 and 2.4 in the drive wheels 2.1 and 2.2 of any head 100, said drive wheels 2.1 and 2.2 can include different configurations. For example, the drive wheels 2.1 and 2.2 may include a respective groove configured to house each traction belt 2.3 and 2.4, the two grooves of each drive wheel 2.1 and 2.2 being separated by a distance equal to the width of the separation gap D. In this case, the separating elements 4 could be dispensed with since the configuration of the grooves would fulfill the function of the separating elements 4. Alternatively, the drive wheels 2.1 and 2.2 may be gear wheels and the traction belts 2.3 and 2.4 may include a configuration complementary to the teeth of said drive wheels 2.1 and 2.2. In these latter cases, the separating elements 4 could be dispensed with depending on the configuration of the drive wheels 2.1 and 2.2 and of the traction belts 2.3 and 2.4, depending on whether or not this configuration allows the movement of the traction belts 2.3 and 2.4 (in which case the use of the separating elements 4 would be advantageous).

Figure 3:
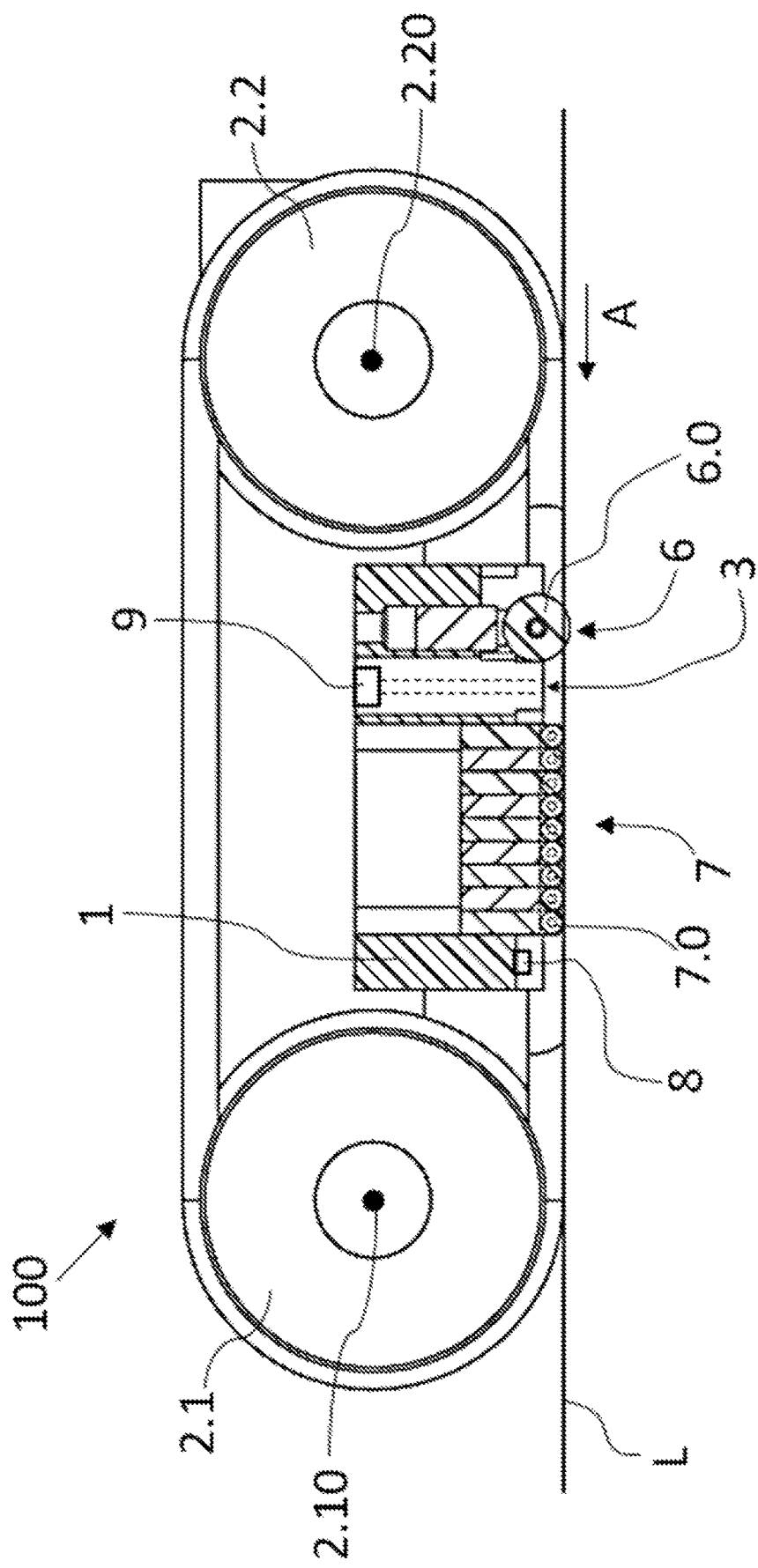
FIG. 3 shows a welding head of a welding station according to another implementation.

Any head 100 may be as the one shown in FIG. 3 by way of example. Said kind of head 100 includes a holding-down device 7 with at least one hold-down member 7.0 arranged downstream of the action area 3 in the first direction A, configured to press on the already welded sheets L. The holding-down device 7 may be housed in a body 1 of the head 100. Thus, when the sheets L move in the first direction A on a support, the holding-down device 7 presses said sheets L against said support, keeping the previously made weld joined to assure to a greater extent that it is correctly completed until it is cooled down. Preferably, furthermore, the holding-down device 7 may include a plurality of hold-down members 7.0 arranged in series in the first direction A, and said hold-down members 7.0 can exert the same force on the sheets L or can be configured such that the pressure force that can be applied by each of the hold-down members 7.0 can be controlled independently. The latter would allow adjusting the force for different types of sheets L or different speeds of movement of the sheets L in the first direction A, for example.

Any head 100 may include a cooler 8, to cool the sealed area which is generated in the separation gap D present between both traction belts 2.3 and 2.4, downstream of the action area 3 in the first direction A. If such a head 100 further includes a holding-down device 7, the cooler 8 is preferably configured to cool the area of the separation gap D downstream of said holding-down device 7 in the first direction A, and/or in the areas of the separation gap D in which the holding-down device 7 acts. Thus, the cooling of the sheets L after being welded is accelerated with the cooler 8, the welding carried out being ensured to a greater extent since the risk of said welding being separated downstream of the head 100 in the first direction A for any reason is reduced.

Figure 6:
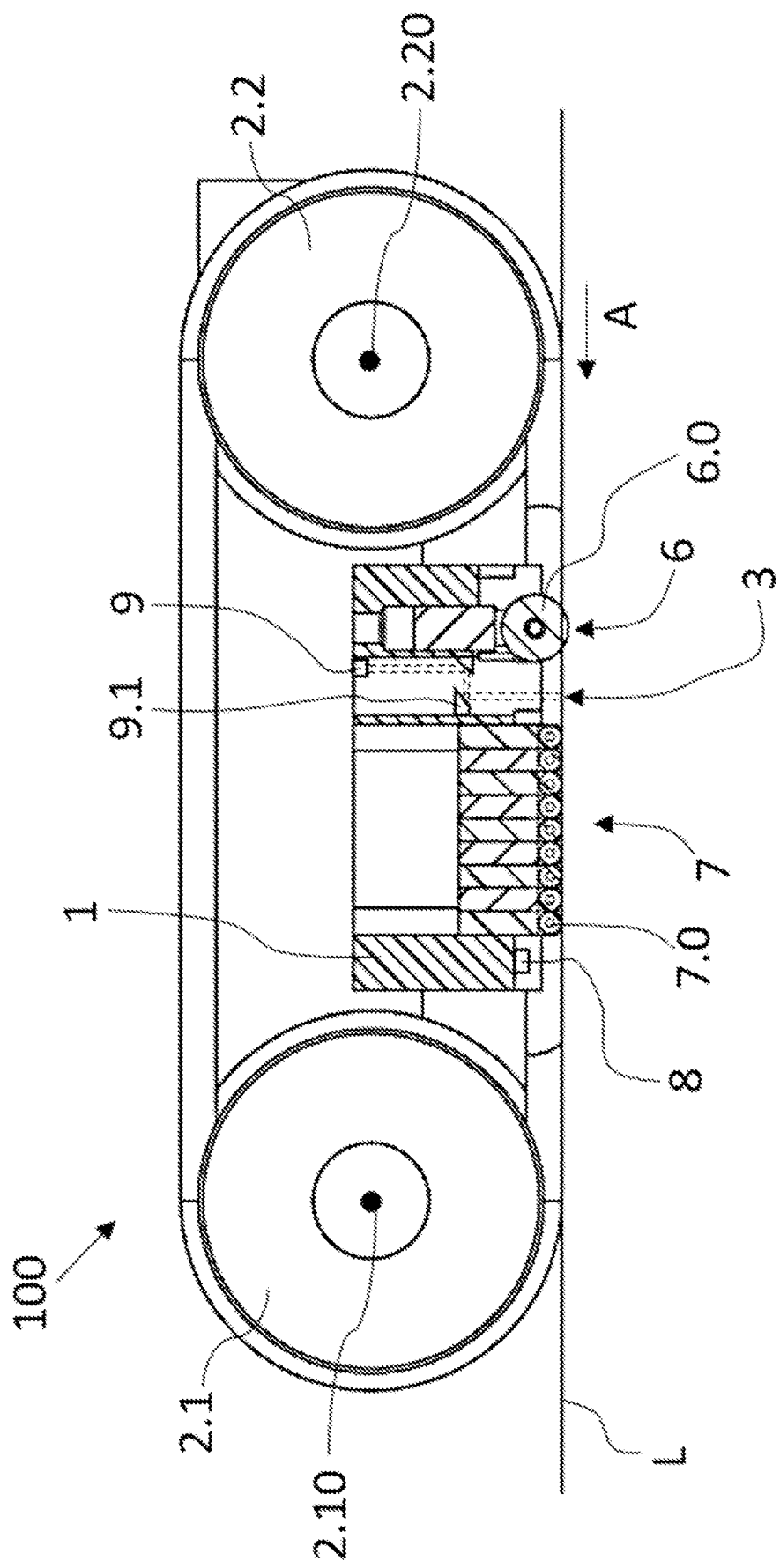
FIG. 6 shows a welding head of a welding station according to another implementation.

A welder 9 may preferably include a laser emitter 9 emitting a laser beam towards the action area 3, directly (FIG. 3) or by additional elements 9.1 (such as mirrors, for example, FIG. 6) arranged between said welder 9 and said action area 3 to redirect said laser beam towards said action area 3. The welder 9 is preferably configured so that the heat reaches the action area 3 vertically.

In some implementations, the welding station 500 may include a support which is facing at least one of the heads 100, preferably all the heads 100, and which is configured so that the sheets L move between said support and said head 100 in the first direction A. Said head 100 is facing the support such that the traction belts 2.3 and 2.4 press the sheets L against said support (but with a force allowing the movement of said sheets L in the first direction A), and cause or aid in the traction of said sheets L as has been previously described, the sealed area described for the first aspect hereof being generated between said support and said head 100. In these implementations, said head 100 preferably includes an actuator 6 which is arranged upstream of the action area 3 in the first direction A and configured to push the sheets L to be welded against the support, as depicted in the example of FIG. 3, such that it is ensured that said sheets L reach the action area 3 tensioned and that the welding can be carried out as effectively and securely as possible. Furthermore, the actuator 6 preferably includes a pressure wheel 6.0 and the support includes a depression complementary with the pressure wheel 6.0 and facing said pressure wheel 6.0, to ensure to a greater extent the generation of the tension in the sheets L.

In other implementations, the support is selected from:
- a support surface, said support surface and at least one head 100, preferably all the heads 100, being arranged such that the traction belts 2.3 and 2.4 of said head 100 press the sheets L against said support surface; and
- a support head 102, as shown in FIG. 4, the support head 102 including two traction belts 102.3 (in the figures only one is depicted), similar to those of at least one head 100, preferably all the heads 100, and said support head 102 and said head 100 facing one another and arranged such that the sheets L are pressed between the corresponding traction belts 2.3 and 2.4 of both said head 100 and the support head 102. The support head 102 further includes a support surface which is at the same level as the traction belts of said support head 102, in the part of said traction belts facing said head 100, such that the sheets L move in the first direction A on said support surface. The support surface faces the action area 3, and delimits the previously described sealed area.

Figure 5:
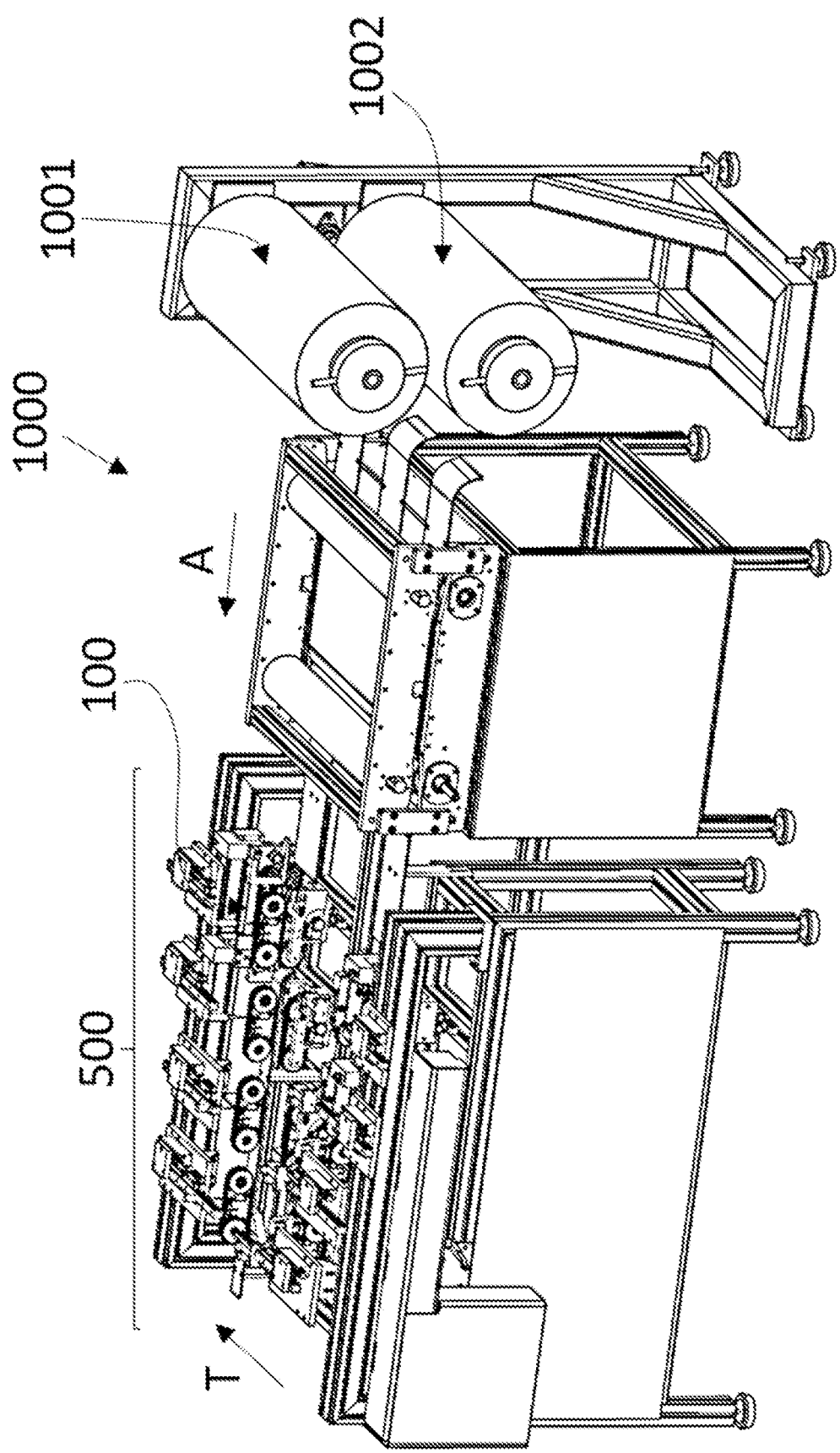
FIG. 5 shows an installation for manufacturing packages with pads including a welding station according to one implementation.

The welding station 500 includes a plurality of longitudinal welding heads 100, each one, preferably, with a facing support, each of the welding heads 100 being configured to be able to move along the second direction T. This allows carrying out a plurality of longitudinal welds of the sheets L, parallel to one another, when the heads 100 are arranged in different positions along said second direction T. Each head 100 is preferably arranged in a determined position along the first direction A, said positions being different from one another (as can be seen in FIG. 5). When the support is a support surface, the same support surface can be facing all the heads 100, whereas when the support includes a support head 102, each head 100 can have a respective support head 102 associated.

FIG. 5 depicts an installation 1000 for manufacturing packages with pads. The installation 1000 includes a respective feeder 1001 and 1002 for feeding each of the two sheets L, and at least one welding station 500. Each of the heads 100 is arranged in a determined position along the second direction T, said positions being different from one another. This allows carrying out different longitudinal welds on the sheets L, along their width (in the second direction T).

Exemplar implementations Implementation are also disclosed in the following clauses.

Clause 1. Longitudinal welding head for an installation for manufacturing packages with pads, is the head (100) being configured to weld to one another two superposed sheets (L) as said sheets (L) advance in a first direction (A), and comprising a welding device configured to apply heat on a determined action area (3) of said head (100) or facing said head (100), the head (100) further comprising a first traction belt (2.3) and a second traction belt (2.4) parallel to the first traction belt (2.3) and separated from the first traction belt (2.3) by a determined separation gap (D) in a second direction (T) which is transverse to the first direction (A), the action area (3) being arranged in said separation gap (D) between both traction belts (2.3, 2.4), or facing said separation gap (D).

Clause 2. Longitudinal welding head according to clause 1, comprising a first drive wheel (2.1) with a first central shaft (2.10) extending in the second direction (T) and a second drive wheel (2.2) with a second central shaft (2.20) parallel to the first central shaft (2.10) and distant from said first central shaft (2.10) in the first direction (A), both traction belts (2.3, 2.4) being wound in both drive wheels (2.1, 2.2).

Clause 3. Longitudinal welding head according to clause 2, comprising a separating element (4) joined to, or arranged in, each of the drive wheels (2.1, 2.2), the first traction belt (2.3) being on one side of said separating element (4) with respect to the corresponding central shaft (2.10) and the second traction belt (2.4) being on the other side of said separating element (4), said separating element (4) comprising a width in the second direction (T) equal to the width of the separation gap (D).

Clause 4. Longitudinal welding head according to clause 3, wherein the outer surface of the separating element (4) of the head (100) is at the same level as the outer surface of the traction belts (2.3, 2.4) or is of a malleable material projecting from said outer surface of the traction belts (2.3, 2.4).

Clause 5. Longitudinal welding head according to any of clauses 2 to 4, wherein each drive wheel (2.1, 2.2) comprises a respective groove for each traction belt (2.3, 2.4), each groove being configured to house the corresponding traction belt (2.3) and both grooves of one and the same drive wheel (2.3, 2.4) being separated by a distance equal to the width of the separation gap (D).

Clause 6. Longitudinal welding head according to any of clauses 2 to 4, wherein the two drive wheels (2.1, 2.2) are gear wheels and the traction belts (2.3, 2.4) comprise a configuration complementary to the teeth of said drive wheels (2.1, 2.2).

Clause 7. Longitudinal welding head according to any of clauses 1 to 6, comprising a holding-down device (7) with at least one hold-down member (7.0) arranged downstream of the action area (3) in the first direction (A) and configured to press the welded sheets (L).

Clause 8. Longitudinal welding head according to clause 7, wherein the holding-down device (7) comprises a plurality of hold-down members (7.0) arranged in series in the first direction (A).

Clause 9. Longitudinal welding head according to clause 8, wherein the hold-down members (7.0) are configured to be able to independently control the pressure force which they can carry out on the sheets (L).

Clause 10. Longitudinal welding head according to any of clauses 1 to 9, comprising a cooling device for cooling the separation gap (D) present between both traction belts (2.3, 2.4), at least downstream of the action area (3) in the first direction (A).

Clause 11. Longitudinal welding head according to any of clauses 1 to 10, wherein the welding device comprises a laser emitter emitting a laser beam towards the action area (3), directly or by means of additional elements arranged between said welding device and said action area (3) to redirect said laser beam towards said action area (3).

Clause 12. Welding station comprising a longitudinal welding head (100) longitudinal according to any of clauses 1 to 11 and a support associated with said head (100), said support being faced to said head (100) and configured so that the sheets (L) move on it in the first direction (A), the support and the head (100) being arranged such that the sheets move between the traction belts (2.3, 2.4) and said support, and the head (100) comprising an actuator (6) arranged upstream of the action area (3) in the first direction (A) and configured to push the sheets (L) to be welded against the support, the actuator (6) comprising a wheel and the support comprising a depression complementary with the wheel of the actuator (6) and facing said wheel.

Clause 13. Welding station comprising a longitudinal welding head (100) according to any of clauses 1 to 11 and a support associated with said head (100), said support being faced to said head (100) and configured so that the sheets (L) move in the first direction (A) between said support and the head (100), the support and the head (100) being facing one another and said support being selected from a support surface, said support surface and the head (100) being arranged such that the traction belts (2.3, 2.4) of the head (100) press the sheets (L) against said support surface; and a support head (102) comprising a first drive wheel (102.1) with a first central shaft (102.10) extending in the second direction (T) and a second drive wheel (102.2) with a second central shaft (102.20) extending parallel to the first central shaft (102.10) and distant from said first central shaft (102.10) in the first direction (A), a first traction belt (102.3) wound in both drive wheels (102.1, 102.2), and a second traction belt wound in both drive wheels (102.1, 102.2) in parallel to the first traction belt and separated from the first traction belt by the separation gap (D) in the second direction (T), said support head (102) and the head (100) being arranged such that the sheets (L) are pressed between the corresponding traction belts (2.3, 2.4) of both heads (100, 102), the support head (102) further comprising a support surface which is at the same level as the traction belts (102.1, 102.2) of said support head (102), in the part of said traction belts (102.1, 102.2) facing the welding head (100), said support surface being facing the welding area (3).

Clause 14. Welding station according to clause 12 or 13, comprising a plurality of longitudinal welding heads (100), each of the welding heads (100) being configured to be able to move along the second direction (T).

Clause 15. Installation for manufacturing packages with pads, wherein it comprises at least one welding station (500) according to any of clauses 12 to 14.

What is claimed is:

1. A welding station for an installation for manufacturing packages with pads, the welding station comprising a plurality of longitudinal welding heads,
    each longitudinal welding head being configured to weld to one another two superposed sheets as said sheets advance in a first direction and comprising a welder to apply heat at a determined action area of said welding head or facing said welding head,
    each longitudinal welding head further comprising a first traction belt and a second traction belt parallel to the first traction belt and separated from the first traction belt by a determined separation gap in a second direction which is transverse to the first direction, the action area being arranged in said separation gap between both traction belts, or facing said separation gap, and
    each of the longitudinal welding heads being configured to be moved along the second direction.

2. The welding station according to claim 1, each longitudinal welding head comprising a first drive wheel with a first central shaft extending in the second direction and a second drive wheel with a second central shaft parallel to the first central shaft and distant from said first central shaft in the first direction, both traction belts being wound in both drive wheels.

3. The welding station according to claim 2, each longitudinal welding head comprising a separating element joined to, or arranged in, each of the drive wheels, the first traction belt being on one side of said separating element with respect to the corresponding central shaft and the second traction belt being on the other side of said separating element, said separating element comprising a width in the second direction equal to the width of the separation gap.

4. The welding station according to claim 3, an outer surface of the separating element of each longitudinal welding head being at the same level as an outer surface of the traction belts or is of a malleable material projecting from said outer surface of the traction belts of the corresponding longitudinal welding head.

5. The welding station according to claim 2, each drive wheel comprising a respective groove for each traction belt, each groove being configured to house the corresponding traction belt and both grooves of one and the same drive wheel being separated by a distance equal to the width of the separation gap.

6. The welding station according to claim 2, the two drive wheels of each welding head being gear wheels and the traction belts comprising a configuration complementary to the teeth of said drive wheels.

7. The welding station according to claim 1, each longitudinal welding head comprising a holding-down device with at least one hold-down member arranged downstream of the action area in the first direction and configured to press the welded sheets.

8. The welding station according to claim 7, each holding-down device comprising a plurality of hold-down members arranged in series in the first direction.

9. The welding station according to claim 8, the hold-down members being configured to independently control a pressure force which they carry out on the sheets.

10. The welding station according to claim 7, each longitudinal welding head comprising a cooler for cooling the separation gap present between both traction belts of the corresponding longitudinal welding head, downstream of the holding-down device in the first direction.

11. The welding station according to claim 1, each longitudinal welding head comprising a cooler for cooling the separation gap present between both traction belts of the corresponding longitudinal welding head, at least downstream of the action area in the first direction.

12. The welding station according to claim 1, the welder comprising a laser emitter emitting a laser beam towards the action area, directly or by one or more additional elements arranged to redirect said laser beam towards said action area.

13. The welding station according to claim 1, comprising a support associated with at least one of the longitudinal welding heads,
    said support being faced to said longitudinal welding head and configured so that the sheets move on it in the first direction, the support and the head being arranged such that the sheets move between the traction belts and said support, and
    the at least one welding head comprising an actuator arranged upstream of the action area in the first direction and configured to push the sheets to be welded against the support, the actuator comprising a wheel and the support comprising a depression complementary with the wheel of the actuator and facing said wheel.

14. The welding station according to claim 1, a support associated with at least one of the longitudinal welding heads,
    said support being faced to said longitudinal welding head and configured so that the sheets move in the first direction between said support and the head,
    the support and the head facing one another and said support being selected from a support surface, said support surface and the head being arranged such that the traction belts of the head press the sheets against said support surface; and
    a support head comprising a first drive wheel with a first central shaft extending in the second direction and a second drive wheel with a second central shaft extending parallel to the first central shaft and distant from said first central shaft in the first direction, a first traction belt wound in both drive wheels, and a second traction belt wound in both drive wheels in parallel to the first traction belt and separated from the first traction belt by the separation gap in the second direction,
    said support head and the head being arranged such that the sheets are pressed between the corresponding traction belts of both heads,
    the support head further comprising a support surface which is at the same level as the traction belts of said support head, in the part of said traction belts facing the welding head, said support surface being facing the welding area.

15. An installation for manufacturing packages with pads, the installation comprising a welding station for an installation for manufacturing packages with pads and the welding station comprising a plurality of longitudinal welding heads, each longitudinal welding head being configured to weld to one another two superposed sheets as said sheets advance in a first direction and comprising a welder to apply heat at a determined action area of said head or facing said head, each longitudinal welding head further comprising a first traction belt and a second traction belt parallel to the first traction belt and separated from the first traction belt by a determined separation gap in a second direction which is transverse to the first direction, the action area being arranged in said separation gap between both traction belts, or facing said separation gap, and each of the longitudinal welding heads being configured to be able to be moved along the second direction.

\* \* \* \* \*